June 14, 1949.  F. C. BEYER ET AL  2,472,803
WELDING APPARATUS
Filed April 17, 1946  4 Sheets-Sheet 2

Inventors
FREDERICK C. BEYER
CLARENCE E. JACKSON

By M. A. Hayes
Attorney

June 14, 1949.  F. C. BEYER ET AL  2,472,803
WELDING APPARATUS
Filed April 17, 1946  4 Sheets-Sheet 3

Inventors
FREDERICK C. BEYER
CLARENCE E. JACKSON
By M. A. Hayes
Attorney

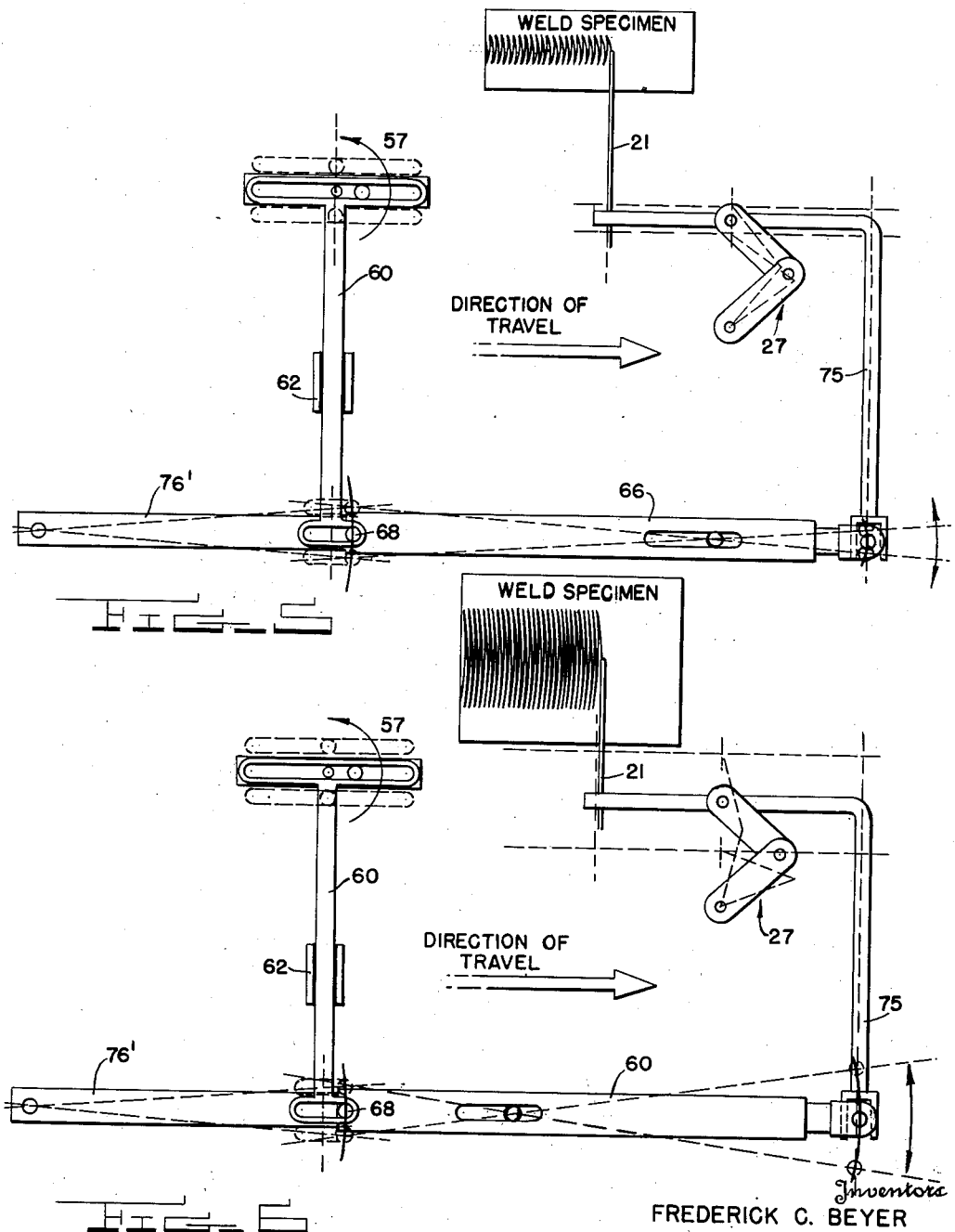

Patented June 14, 1949

2,472,803

UNITED STATES PATENT OFFICE 2,472,803

WELDING APPARATUS

Frederick C. Beyer, Washington, D. C., and Clarence E. Jackson, Niagara Falls, N. Y.

Application April 17, 1946, Serial No. 662,768

3 Claims. (Cl. 219—8)

(Granted under the act of March 3, 1883, as amended April 30, 1928; 370 O. G. 757)

This invention relates to welding apparatus and more particularly to welding apparatus, wherein, while the welding electrodes are moved along the line of weldment, the electrodes may be caused to reciprocate in a plane lying at an angle to the line of primary motion to extend the area of weld.

In certain types of welding operations, and particularly in metal arc welding, it is sometimes desirable that the welding head, while traveling progressively along the junction of the pieces to be joined, at the same time move back and forth across the junction line to extend the area of the weld. It will be readily apparent that there are practical limitations on the maximum weld width to be obtained by employing large diameter electrodes. On the other hand, while it is quite feasible to extend the area of the weld by causing the welding head, in effect, to move from side to side as it progresses along the junction line, it has been found that the most desirable type of transverse motion for a given set of welding conditions depends upon numerous factors including the welding position, that is: whether the weld is to be made in a flat, horizontal, vertical, or overhead position, the type of metal being welded, the welding material, and the current employed. While it is thus possible to determine the optimum type of movement of the welding head, heretofore suitable apparatus has not been available for controlling the welding head to provide the wide variety of transverse movements required.

An object of the present invention is to provide a new and improved welding apparatus.

A further object of the present invention is to provide a welding apparatus in which the welding head is capable of moving transversely with respect to the path along which the welding head progresses.

In accordance with one embodiment of this invention a welding apparatus may be provided including a pantograph support for the welding head and a control mechanism for imparting thereto a wide variety of movements generally transverse to the path of progression of the welding head. This control mechanism includes a longitudinally reciprocable bar pivotally coupled at substantially right angles to one end of a second longitudinally reciprocable, pivotally mounted bar so as to impart a pivotal motion thereto. The other end of the second bar is linked to the welding head so as to move the welding head in accordance with the movement of the bar. Means are provided for adjusting both the radius and the length of the transverse movement of the welding head. Means are also provided operable to impart a variable longitudinal reciprocation to the welding head to cause the transverse reciprocation thereof to become substantially semi-elliptic.

Other objects and advantages of the present invention will be apparent from the following detailed description taken in conjunction with the drawings wherein:

Fig. 5 is a view similar to Fig. 4, showing, however, the adjustment of the control elements required to produce a narrow weld in which the welding head moves in a short, arcuate path of substantially the same radius as that shown in Fig. 4; and Fig. 6 is a view similar to Fig. 5, the radius of the arcuate transverse movement of the welding head having been substantially increased.

Figure 1:
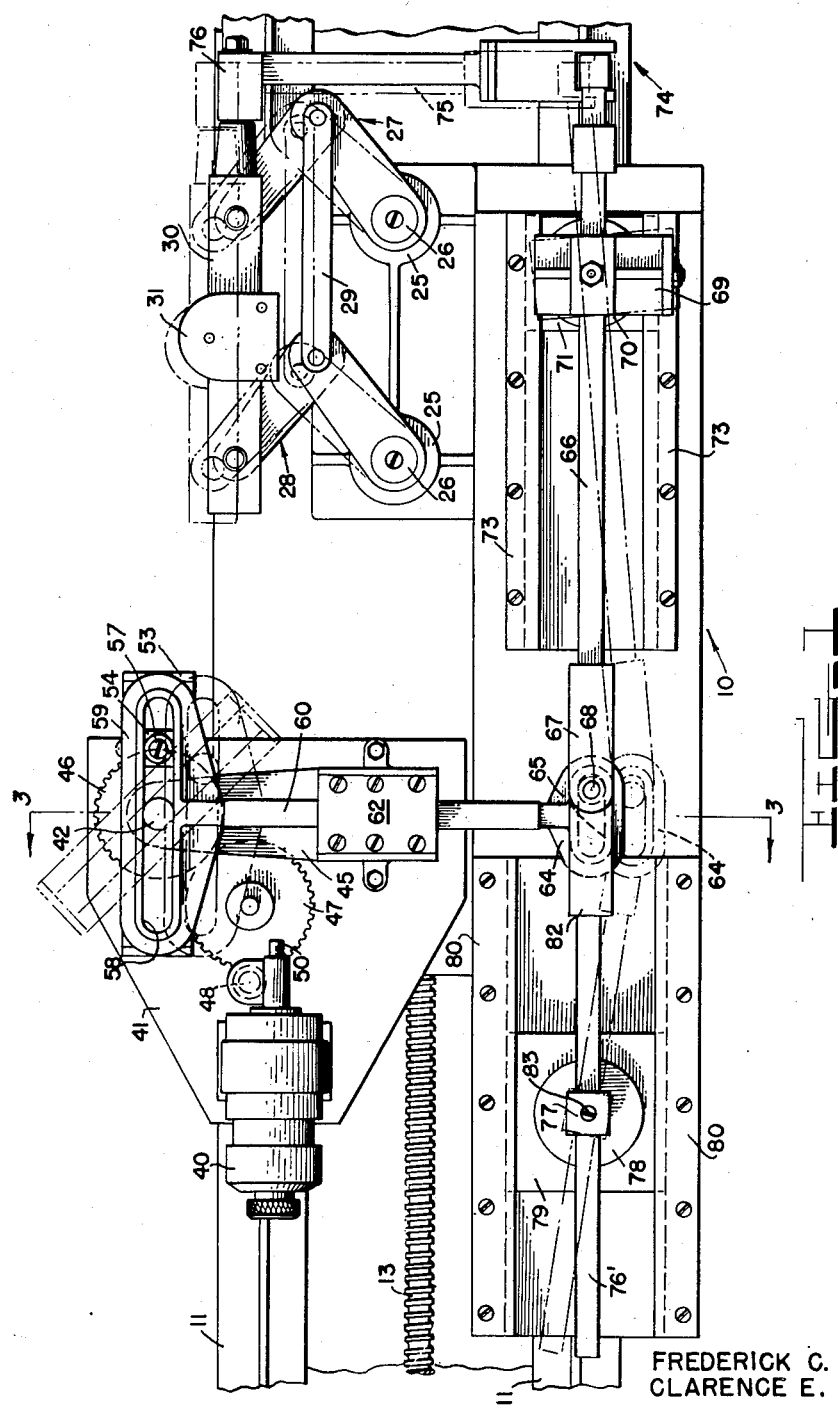
Fig. 1 is a fragmentary, plan view of a welding apparatus constructed in accordance with this invention.
Figure 2:
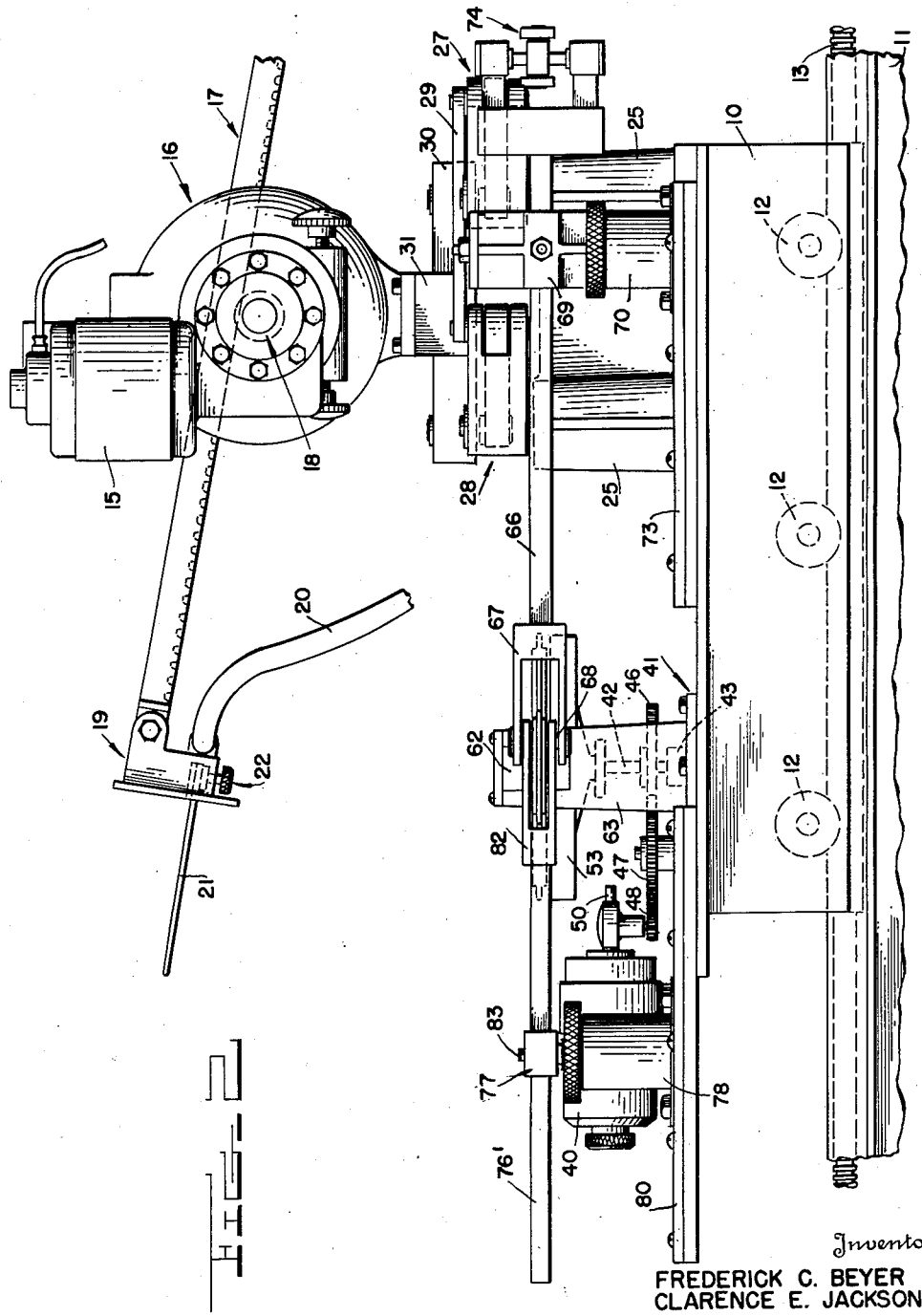
Fig. 2 is a front elevational view of the apparatus shown in Fig. 1, a conventional automatic welding head being shown assembled thereon.

Referring now to the drawings, and particularly to Figs. 1 and 2 thereof it will be seen that this apparatus includes a carriage 10, which is supported on a pair of spaced, parallel rails 11, which form a bed for the apparatus, by a number of suitably disposed rollers 12 mounted on the carriage 10. A lead screw 13 extends parallel to the rails 11 and is engaged by a suitable member (not shown) associated with the carriage 10 so that by rotating the lead screw the carriage may be caused to move along the rails, the operation of the lead screw being either continuous or intermittent as required. Other means may of course be employed for advancing the carriage and in some cases the carriage may be moved manually.

A conventional welding head is shown in Fig. 2 supported on the carriage 10 and may include a motor 15, connected to a gear reduction drive 16. A rack 17 is moved by a pinion 18, driven by the motor 15 and gear reduction drive 16 and electrode holder 19 is fixed to the outer end of the rack 17. A heavy lead 20 is provided for connecting the electrode holder to a suitable current source (not shown). An electrode 21 is shown mounted in the electrode holder and is held thereon by set screw 22. Welding heads of the type shown are widely employed and are often provided with automatic controls whereby the electrode spacing from the part being welded is maintained at a constant predetermined distance.

In the present apparatus instead of mounting the welding head directly on the carriage 10 as in conventional welding apparatus, because of the transverse motion desired a pantograph type support is provided so that the welding head is constrained to move in a horizontal plane extending substantially at right angles to the rails 11. As may be seen in Figs. 1 and 2 the pantograph support includes two spaced, short, vertically disposed, hollow posts 25, the lower ends of which are rigidly mounted on the upper surface of the carriage 10. Short shafts 26 are journaled in the posts 25 and, as may be seen in Fig. 1, the upper end of each shaft 26 has fixed at right angles thereto one end of a short, heavy arm 27, to the outer ends of which are pivotally attached similar arms 28. A link bar 29 extends between the junctions of the arms 27 and 28 to maintain parallelism, while a heavy insulated bar 30 extends between the outer ends of the arms 28 and is pivotally supported thereby. A mounting plate 31 is fixed to the upper side of the bar 30 and disposed substantially mid-way between the outer ends of the arms 28, as may be seen in Fig. 1. This plate serves as a base to which the welding head is secured.

Thus, as all the pivotal shafts such as 26 of the pantograph are vertical, the mounting plate 31 and consequently the welding head carried thereon are constrained to move in a horizontal plane parallel to the bed and guide rails 11 so that the working end of the electrode at the welding arc, assuming the rate of electrode feed to be equal to the rate of consumption, will also move only in a horizontal plane. An important advantage of this structure is that the distance of the electrode from the work remains constant regardless of the extent of oscillatory motion of the electrode. It will be understood that the terms vertical and horizontal are here used in a relative sense to describe the relative position of parts to each other regardless of their terrestrial orientation, because the machine as a whole may be set at any angle and work as well as when positioned as shown.

Figure 3:
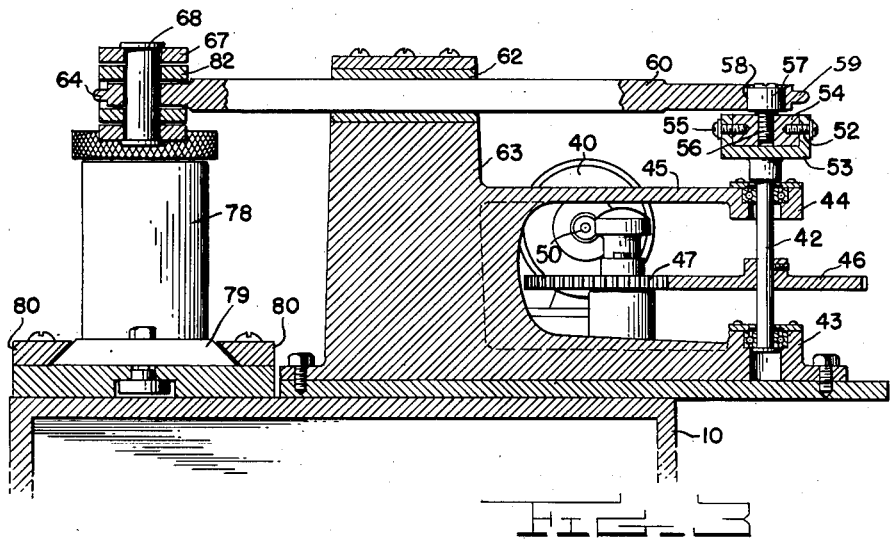
Fig. 3 is an enlarged, vertical, sectional view taken substantially along the line 3—3 of Fig. 1.

In order to cause the welding head to reciprocate transversely with respect to the direction of movement of the carriage, as controlled by the rotation of the lead screw 13, and to control the configuration of the reciprocating path so that a reciprocatory motion varying from substantially semi-elliptic, to arcuate, to substantially rectilinear may be obtained, a control mechanism has been provided including a variable speed motor 40, which, as viewed in Fig. 2, may be mounted on a bracket plate 41 fixed to the left portion of the carriage 10 or integrally formed therewith. The motor 40 is employed to rotate a vertically disposed shaft 42, the lower end of which is journaled in a bearing housing 43 provided adjacent the right end of the plate 41, as viewed in Fig. 3, while the upper end of the shaft 42 is journaled in and extends through a bearing 44 mounted on a bracket arm 45, as shown in Fig. 3. The driving connection between the shaft 42 and the motor 40 is provided by a spur gear 46 which is fixed to the shaft 42 and which meshes with a second spur gear 47, driven by a pinion gear 48, in turn driven by a worm gear (not shown) fixed to the shaft 50 of the motor 40. It will be understood that other means for rotating the shaft 42 may be substituted for that shown without departing from the scope of the present invention.

Fixed to the upper end of the shaft 42 and rotatable about the axis thereof is a channel bar 53 having a substantially U-shaped cross section, the upper end of the shaft 42 being fixed to the underside of the bar 53 substantially mid-way between the ends of the bar. As may be seen in Fig. 3 the sides of the channel bar 53 are provided with longitudinally extending slots 52 so that a small rectangular block 54 which is slidably disposed between the sides of the bar 53, may be secured in position on the bar by set screws 55 which extend from either side of the block through the slots formed in the sides of the bar. A stub shaft 56 has its lower end threaded into the block 54 and has rotatably mounted on its upper end a roller 57, the axis of rotation of the roller being parallel to the axis of the shaft 42. The roller 57 is located in an elongated slot 58 formed in a cross piece 59 of a longitudinally reciprocable yoke bar 60. This mechanism sometimes is referred to as a "Scotch yoke." The yoke bar 60 extends through and is journaled in a guide bearing 62 fixed to the upper end of a pedestal member 63 and is provided at its lower end, as viewed in Fig. 1, with a second cross member 64, having a slot 65.

From the foregoing, it will be apparent that rotation of the shaft 42 will cause reciprocation of the yoke bar 60, the frequency of reciprocation depending upon the speed of rotation of the shaft while the amplitude of reciprocation depends upon the adjustment of the position of the block 54 with respect to bar 53, the further the block 54 is removed from the axis of rotation of the shaft 42, the greater being the amplitude of reciprocation. It will be apparent also that other means than the "Scotch yoke" could be employed for effecting variable amplitudes and speeds of reciprocation of the bar 60, such for example, as a cam.

Referring now to Figs. 1 and 2, it will be seen that a long bar 66 is there illustrated to the left end of which is fitted with a fork 67. The right end of the cross member 64 is disposed between the sides of the fork 67 and a vertically disposed shaft 68 is mounted transversely through the sides of the fork with its mid-portion disposed in the slot 65 formed in the cross member 64. The bar 66 is supported by a bearing block 69, the right portion of the bar 66, as viewed in Figs. 1 and 2, being slidably mounted therein and extending therethrough. The block 69 is in turn pivotally mounted on a pedestal member 70, the base of which is provided with a rectangular flange 71 whereby the pedestal member 70 is supported on the upper surface of the carriage 10. The pedestal member 70 is slidably adjustable with respect to the carriage 10 and is constrained to move in a path at right angles to the axis of reciprocation of the bar 60 by a pair of spaced guide members 73 which are fixed to the upper surface of the carriage 10 and are undercut to engage the sides and upper edges of the flange 71, as clearly shown in Fig. 1. The right end of the bar 66, which, as may be seen in Figs. 1 and 2 extends beyond the carriage 10, has fixed thereto a swivel joint 74 by which the bar 66 is pivotally connected to one end of a link arm 75, the other end of which is rigidly fixed to a projection 76 extending from the right side of the welding head supporting bar 30. When the yoke bar 60 is reciprocated by rotation of the shaft 42, the bar 66 is caused to pivot or oscillate about the axis of rotation of the supporting block 69, this in turn imparting a reciprocating motion to the welding head transverse to the direction of travel of the carriage 10 along the rails 11. It will be apparent that the amplitude of movement of the welding head will depend on two factors: (1) the amplitude of reciprocation of the bar 60 and (2) the position of the pedestal number 70 with respect to the bar 66. It will also be apparent that the position of the pedestal member 70 determines the radius of curvature of the arcuate path of movement of the welding head, and that the further the pedestal member is moved from the right end of the carriage 10, as viewed in Fig. 1, the greater will be the radius of curvature of the arcuate movement, as well as the amplitude of movement. To a large extent the type of weaving motion to be obtained may be controlled by the enumerated two factors and for many purposes such variations in movement as are feasible with the apparatus so far described are adequate. In some cases however a further degree of control is desirable and this is particularly so where it is required to provide a hesitation or dwell at the end of each transverse stroke, that is, to cause the welding head in effect to pause at the outer end of each reciprocation to permit adequate heating. The need for this hesitation is well known to the welding art but heretofore has been accomplished only by manual control.

In accordance with the present invention, a wider degree of control of the type of reciprocation is provided as well as making possible an adjustment of the control mechanism whereby the effect of a pause is obtained at each extremity of the reciprocable movement of the welding head. This is accomplished by employing a horizontally disposed bar 76' which is journaled through a block 77, pivotally mounted at the upper end of a pedestal member 78, similar to the pedestal member 70 hereinbefore described. A rectangular flange 79 is provided at the base of the pedestal member 78 and serves to support the pedestal member 78 on the upper surface of the carriage 10 adjacent the left side thereof as viewed in Figs. 1 and 2. Undercut guide rails 80 are mounted on the upper surface of the carriage 10 in spaced, parallel relation and serve to confine the adjustment of the pedestal member 78 to a path lying at right angles to the plane of reciprocation of the bar 60 and axially aligned with the axis of adjustment of the pedestal member 70. The right end of the bar 76' has fixed thereto a fork 82 of somewhat smaller dimensions than the fork 67 fixed to the left end of the bar 66 and the fork 82 extends over the cross member 64 but between the spaced sides of the fork 67, as may be seen in Fig. 2. The fork 82 is drivably connected to the cross member 64 by the shaft 68 carried by the fork 67 so that as the yoke bar 60 is reciprocated, the bar 76' will be caused to pivot about the axis of the block 77. A set screw 83 is threaded into the block 77 to lock the bar 76' thereto when the desired adjustment of the pedestal member 78 has been made.

Figure 4:
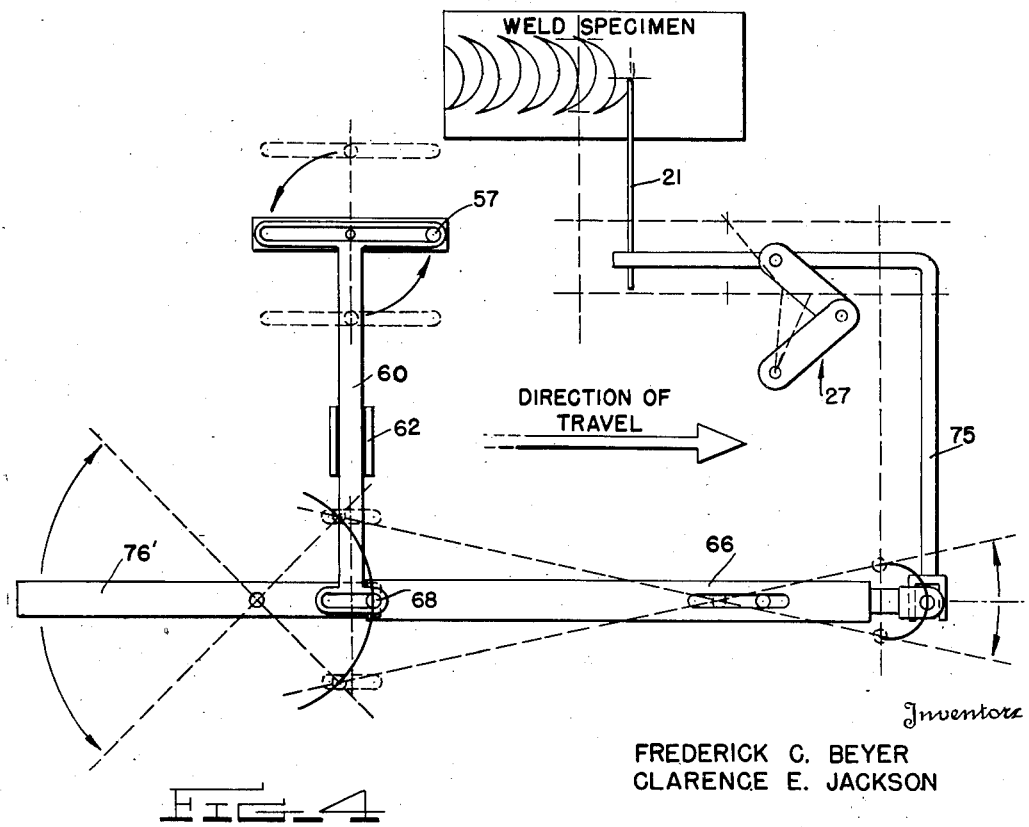
Fig. 4 is a schematic view illustrating the relative positions of the control mechanism elements when adjusted to produce a broad, short radius, substantially semi-elliptic transverse motion of the welding head.

In the operation of this device, while the carriage 10 is advanced along the rails 11 by the lead screw 13, as the yoke bar 60 is reciprocated the end of the fork 82 will move in an arcuate path, the radius of curvature of which is dependent on the position of the pedestal member 78 with respect to the end of the fork, the radius increasing as the pedestal member is moved to the left, as viewed in Figs. 1 and 2. Thus, while the long bar 66 is free to move pivotally about the axis of the supporting block 69, since the left end of the bar 66 is attached to the right end of the bar 76', as the yoke bar 60 moves from center position, the bar 66 will be caused to move to the left, as viewed in Fig. 2, the distance of movement depending on the radius of movement of the fork 82, and increasing as this radius is decreased. By adjusting the pedestal member 78 so that this radius is short, the long bar 66 will be moved to the left, as viewed in Figs. 1 and 2, as well as being pivoted as the bar 76' is pivoted past the center line causing a substantially semi-elliptic transverse movement to be imparted to the welding head support. This type of reciprocation and the requisite adjustment of the control elements are shown in Fig. 4. The semi-elliptic movement achieved by using a short radius movement on the fork 82 causes the electrode to retrace a portion of the path of movement particularly at the extremities thereof, thus providing the same results obtained by causing the electrode to hesitate at the end of each stroke and thereby to dwell at that point. The maximum rate of longitudinal movement of the bar 66 occurs at the extreme end of each reciprocation, as will be readily apparent.

As the radius of movement of the fork 82 is increased, the amplitude of longitudinal reciprocation of the bar 66 as it is pivoted is correspondingly decreased and accordingly the movement imparted to the welding head support becomes less elliptic and more generally arcuate.

Referring to Fig. 5 it will be seen that the radius of movement of the fork 82 has been increased substantially thus rendering the motion imparted to the welding head less elliptic and more nearly arcuate. At the same time the amplitude of reciprocation of the bar 60 has been decreased by moving the adjustable block 54 nearer to the center of the channel bar 53, this latter adjustment causing a corresponding reduction in the length of the transverse movement of the welding head. In Fig. 6 the radius of movement of the fork 82 and amplitude of reciprocation of the bar 60 are the same as in Fig. 5. However, the pedestal member 70 has been moved to the left increasing the radius of movement of the right end of the bar 66. This causes a corresponding increase in the length of transverse movement of the welding head and at the same time makes the path more nearly rectilinear. By various combinations of these adjustments the movement of the welding head may be controlled closely to provide transverse movement varying from substantially rectilinear to substantially semi-elliptic.

Where herein the various parts of the invention have been referred to as being located in a right or left position, it will be understood that this is done solely for the purpose of facilitating description and that the references relate only to the relative position of the parts as shown in the accompanying drawing.

While but one embodiment of this invention has been shown and described, it will be understood that many changes and modifications may be made therein without departing from the spirit or scope of the present invention.

The invention shown and described herein may be manufactured or used by or for the Government of the United States of America for governmental purposes without the payment of any royalties thereon or therefor.

What is claimed is:

1. A welding apparatus including a bed, a carriage supported on and movable along said bed in a substantially straight line, means for advancing said carriage along said bed, a welding head mounted on said carriage and constrained to move thereon in a horizontal plane, means connected to said welding head for causing said welding head to reciprocate across the line of advance of said carriage, and means associated with said welding head reciprocating means imparting thereto a component of motion parallel to the direction of movement of said carriage whereby a substantially semi-elliptic movement is imparted to said welding head as it is reciprocated.

2. A welding apparatus including a bed, a carriage supported on and movable along said bed in a substantially straight line, means for advancing said carriage along said bed, a welding head mounted on said carriage and constrained to move thereon in a horizontal plane, means connected to said welding head for causing said welding head to reciprocate across the line of advance of said carriage, and means associated with said welding head reciprocating means imparting thereto a component of motion parallel to the direction of movement of said carriage, whereby a longitudinal motion component is imparted to said welding head as it is reciprocated.

3. A welding apparatus including a bed, a carriage supported on and movable along said bed, means for advancing said carriage along said bed, a welding head mounted on said carriage and constrained to move thereon in a horizontal plane, means connected to said welding head for causing said welding head to reciprocate across the line of advance of said carriage, and means associated with said welding head reciprocating means imparting thereto a motion component parallel to the direction of movement of said carriage, whereby a longitudinal motion component is imparted to said welding head mainly near the extremity of each reciprocation.

FREDERICK C. BEYER.
CLARENCE E. JACKSON.

REFERENCES CITED

The following references are of record in the file of this patent:

UNITED STATES PATENTS

| Number | Name | Date |
|---|---|---|
| 1,298,590 | Smith | Mar. 25, 1919 |
| 1,502,489 | Steenstrup | July 22, 1924 |
| 1,508,690 | Glasser | Sept. 16, 1924 |
| 1,580,020 | Cutler et al. | Apr. 6, 1926 |
| 1,667,585 | Chapman | Apr. 24, 1928 |
| 1,676,985 | Haughton | July 10, 1928 |
| 1,932,042 | Koch | Oct. 24, 1933 |
| 1,933,340 | Raymond | Oct. 31, 1933 |
| 1,956,406 | Vars | Apr. 29, 1934 |
| 2,405,663 | Miller | Aug. 13, 1946 |